R. N. HARRISON,
Assignor to A. W. HENKLE, C. T. PALMER, and T. J. CURTIS.
EGG BEATER.
No. 10,228. Reissued Oct. 31, 1882.
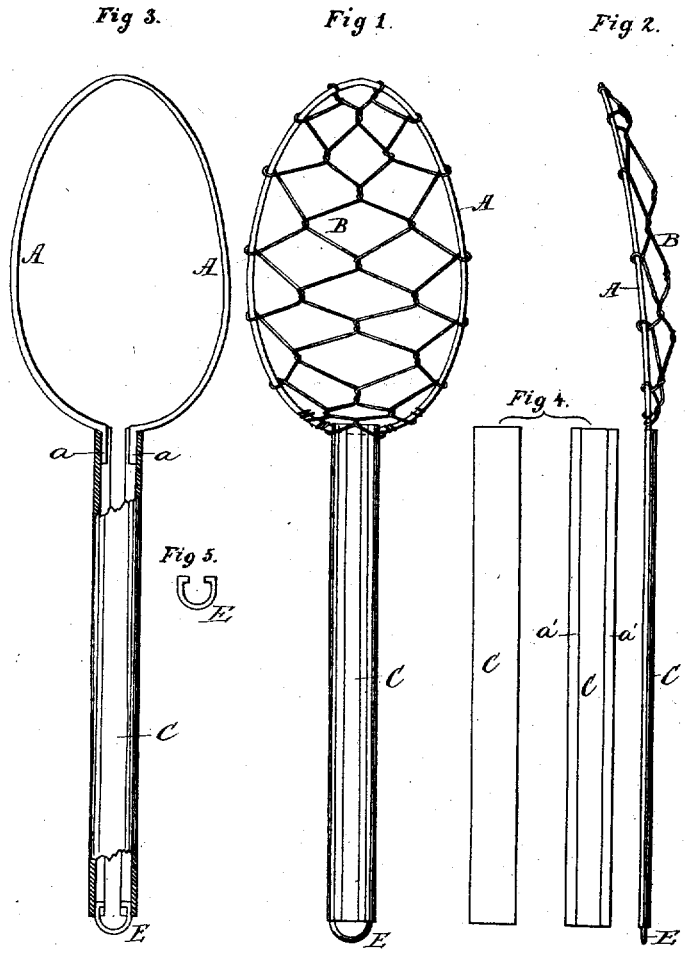
Witnesses
W. C. Corlies
Jno. C. MacGregor
Inventor
Reuben N. Harrison
By Coburn & Thacher
Attorneys.
N. PETERS, Photo-Lithographer, Washington, D. C.

UNITED STATES PATENT OFFICE.

REUBEN N. HARRISON, OF FARIBAULT, MINNESOTA, ASSIGNOR TO ADOLPH W. HENKLE, OF MINNEAPOLIS, AND CHARLES T. PALMER, OF FARIBAULT, MINNESOTA, AND THOMAS J. CURTIS, OF LINCOLN, NEBRASKA.

EGG-BEATER.

SPECIFICATION forming part of Reissued Letters Patent No. 10,228, dated October 31, 1882.

Original No. 200,290, dated February 12, 1878. Application for reissue filed September 4, 1882.

*To all whom it may concern:*

Be it known that I, REUBEN N. HARRISON, a citizen of the United States, residing at Faribault, in the county of Rice and State of Minnesota, have invented a certain new and useful Improvement in Egg-Beaters, which is fully set forth in the following specification, reference being had to the accompanying drawings, in which—

Figure 1 is a face or plan view of my improved egg-beater, and Fig. 2 a side or edge view of the same. Figs. 3, 4, and 5 illustrate details of construction.

My invention relates to the class of egg-beaters having wire agitators; and it consists of an egg-beater having an agitator composed of a frame and intervening cross-wires supported thereby.

I will proceed to describe one embodiment of my invention—viz., that shown in the accompanying drawings.

A represents the wire frame of the agitator. Its ends *a a* are bent outward to adapt them to enter and be secured in the end of the handle C, as shown in Fig. 3. This handle C is constructed of an oblong rectangular plate of sheet metal by bending or turning in its side edges, *a′ a′*, as shown in Fig. 4. The ends *a a* of the frame A are clamped in the handle C by pressing down the turned-over edges *a′ a′* and then soldering the parts firmly together. The body B of the agitator is formed of wires crossing each other, giving the agitator the general configuration of net-work, which wires are supported by the frame A. The bent wire E, Fig. 5, is inserted and soldered in the outer end of the handle C, and serves as a loop by which to suspend the beater from a nail.

By my construction I am enabled to use much lighter, and consequently much sharper, wire for the body of the agitator than is possible in those egg-beaters in which the agitator as a whole is mechanically a mere continuation of the handle. Of course the cross-wires are of such size as to prevent motion of the body of the agitator relatively to the frame thereof.

Having thus described my invention, what I claim as new, and desire to secure by Letters Patent, is—

1. In an egg-beater, the agitator composed of a frame and intervening cross-wires supported thereby, in combination with the handle, substantially as and for the purpose described.

2. An egg-beater composed of a sheet-metal handle, C, having its edges *a′* bent inward, an agitator-frame formed of a wire, A, whose projecting ends *a* are secured in the handle, and the wire body B, in combination, substantially as set forth.

REUBEN N. HARRISON.

Witnesses:
C. D. HARRISON,
L. J. PALMER,
C. T. PALMER.